United States Patent
Agarwal et al.

(10) Patent No.: US 6,795,817 B2
(45) Date of Patent: Sep. 21, 2004

(54) METHOD AND SYSTEM FOR IMPROVING RESPONSE TIME OF A QUERY FOR A PARTITIONED DATABASE OBJECT

(75) Inventors: Nipun Agarwal, Santa Clara, CA (US); Ravi Murthy, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 419 days.

(21) Appl. No.: 09/872,670

(22) Filed: May 31, 2001

(65) Prior Publication Data

US 2002/0184253 A1 Dec. 5, 2002

(51) Int. Cl.$^7$ .............................................. G06F 17/30
(52) U.S. Cl. .................... 707/2; 707/2; 707/7; 707/6
(58) Field of Search .................... 707/1–10, 101–104.1, 707/2–6, 7, 102, 103 R

(56) References Cited

U.S. PATENT DOCUMENTS

| | | | |
|---|---|---|---|
| 5,710,915 A | * | 1/1998 | McElhiney ..................... 707/3 |
| 5,813,000 A | * | 9/1998 | Furlani ........................... 707/3 |
| 5,893,104 A | * | 4/1999 | Srinivasan et al. ......... 707/102 |
| 5,960,194 A | * | 9/1999 | Choy et al. .................... 77/102 |
| 6,128,610 A | | 10/2000 | Srinivasan et al. |
| 6,192,358 B1 | | 2/2001 | Fuh et al. |
| 6,219,662 B1 | | 4/2001 | Fuh et al. |
| 6,338,056 B1 | * | 1/2002 | Dessloch et al. ............... 707/2 |
| 6,370,522 B1 | * | 4/2002 | Agarwal et al. ............... 707/2 |
| 6,401,083 B1 | * | 6/2002 | Agarwal et al. ............... 707/2 |
| 6,405,198 B1 | * | 6/2002 | Bitar et al. ..................... 707/6 |
| 6,421,666 B1 | * | 7/2002 | Murthy et al. ................. 707/3 |
| 6,470,331 B1 | * | 10/2002 | Chen et al. ..................... 707/2 |
| RE37,965 E | * | 1/2003 | Jhingran et al. |
| 6,510,435 B2 | * | 1/2003 | Bayer ......................... 707/100 |
| 6,546,382 B1 | * | 4/2003 | Amor et al. .................... 707/2 |
| 6,564,221 B1 | * | 5/2003 | Shatdal ....................... 707/102 |
| 6,665,684 B2 | * | 12/2003 | Zait et al. .................... 707/102 |
| 2002/0087531 A1 | * | 7/2002 | Hara et al. ...................... 707/3 |

* cited by examiner

*Primary Examiner*—Jean R. Homere
*Assistant Examiner*—Leslie Wong
(74) *Attorney, Agent, or Firm*—Bingham McCutchen LLP

(57) ABSTRACT

A method and mechanism to improve the response time of a query that is executed against a partitioned database object. Only a subset or portion of the partitions are accessed during each pass through the partitions, in which only the retrieved portions of the partitions are processed, and in which results can be immediately returned for the query. Processing only a subset of a partition in a given pass permits each partition to be processed multiple times, rather than requiring a first partition to be entirely processed before processing a second partition. In one approach, the query includes a statement to order the result set for a query against a partitioned database object that contains a local index.

33 Claims, 6 Drawing Sheets

202 — Salary Table — 204

| Userid | Salary |
|---|---|
| A01 | 100 |
| A17 | 100 |
| A15 | 120 |
| A07 | 70 |
| B10 | 130 |
| B15 | 170 |
| B60 | 110 |
| B05 | 105 |
| C01 | 10 |
| C05 | 5 |
| C20 | 20 |
| C15 | 25 |
| ⋮ | ⋮ |

METHOD AND SYSTEM FOR IMPROVING RESPONSE TIME OF A QUERY FOR A PARTITIONED DATABASE OBJECT

BACKGROUND AND SUMMARY

The present invention relates to the field of computer systems. More particularly, the invention relates to a method and system for improving the response time to execute a query involving a partitioned database object.

Database management systems are computer-based systems that manage and store information. In many database systems, users store, update, and retrieve information by submitting commands to a database application responsible for maintaining the database. In a traditional client-server architecture, the user is located at a client station while the database application resides at a server. With the widespread use of the internet, multi-tier database architectures are now common. In one approach to a multi-tier system, the user is given access through a user interface (e.g., a web browser) at a user station, the user interface sends information requests to a middle-tier server (e.g., a web server), and the web server in turn handles the retrieval and packaging of data from one or more back-end database servers. The packaged information "page" is thereafter sent to the user interface for display to the user.

As advances are made to computer hardware and software systems, the quantity of data managed by database systems is increasingly becoming larger. Presently available database systems, such as the Oracle 8i product from Oracle Corporation of Redwood Shores, Calif., are capable of supporting many terabytes of data right out of the box.

The drawback with implementing a database having a very large amount of data is it is that, all else being equal, a query against a large set of data normally has a worse response time than the same query against a smaller set of data. In one approach to executing a database query, the entire body of relevant data (or relevant indexes) in the database is processed to produce a responsive reply to the query. Thus, the slower response times of a query against a larger body of data can be directly attributed to the larger quantities of data that are accessed to satisfy the database query. As larger databases are increasingly being proliferated, greater levels of delays will exist for users seeking to query these larger databases. These delays could become an exasperating source of delays and inefficiencies for organizations that use large database systems.

An example of this problem exists with respect to the typical internet search engine. Internet search engines maintain a searchable database of web sites that may be indexed in various ways. With the numbers of internet web sites explosively increasing in recent years, the amount of web site data maintained and searched by the internet search engine has correspondingly increased. The larger sets of data that must be searched to satisfy a search request could create increasingly large delays before search results are returned to the user by the search engine. Since many search engines performs a sorting operation upon the search results (e.g., based upon the number of times a search term appears on a web site), all of the responsive data in the larger body of information maintained by the search engine may be searched and sorted to ensure a correct order for the search results before any results are presented to the user. This is particularly frustrating for users that only wish to view the most relevant information from the first few pages of the search results, rather than the less useful information that often appears on the nth page returned by the search engine.

A query may seek to access a partitioned database object. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions."

The invention provide a method and mechanism to improve the response time of a query that is executed against a partitioned database object. One disclosed embodiment of the invention is particularly applicable to queries that involve relative ranking or ordering of results to be computed across multiple partitions of a partitioned database table. Since evaluation of predicates on a partitioned object typically involves iterating over one partition at a time, evaluating such queries normally requires significant overhead to retrieve, store, and sort data, as well as delays resulting from blocking the query results until all the partitions have been processed. An embodiment of the present invention addresses this problem by accessing only portions of the partitions during each pass through the partitions, processing only the retrieved portions of the partitions, and immediately returning results to the query. These steps are repeated until all of the results needed to satisfy the query has been provided. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 2a depicts an example database table.

FIG. 2b shows an example partitioning scheme applied to the database table of FIG. 2a.

DETAILED DESCRIPTION

The invention is described with reference to specific embodiments. It will, however, be evident that various modifications and changes may be made thereto without departing from the broader spirit and scope of the invention. The reader is to understand that the specific ordering and combination of process actions shown in the process flow diagrams and system components in component diagrams described herein are merely illustrative, and the invention can be performed using different, additional, or different combinations/ordering of process actions and components. For example, the invention is particularly illustrated herein with reference to partitioned database tables, but it is noted that the inventive principles are equally applicable to other types of partitioned database objects. The specification and drawings are, accordingly, to be regarded in an illustrative rather than restrictive sense.

One disclosed embodiment of the invention provides a method and mechanism to improve the response time of a query that is executed against a partitioned database table, and is particularly applicable to queries that involve relative ranking or ordering of results to be computed across multiple partitions of the partitioned database table. Since evaluation of predicates on a partitioned table typically involves iterating over one partition at a time, evaluating such queries normally requires significant overhead to retrieve, store, and sort data, as well as delays resulting from blocking the query results until all the partitions have been processed. An embodiment of the present invention addresses this problem by accessing only portions of the partitions, processing only the retrieved portions of the partitions, and immediately returning results to the query.

Figure 1:
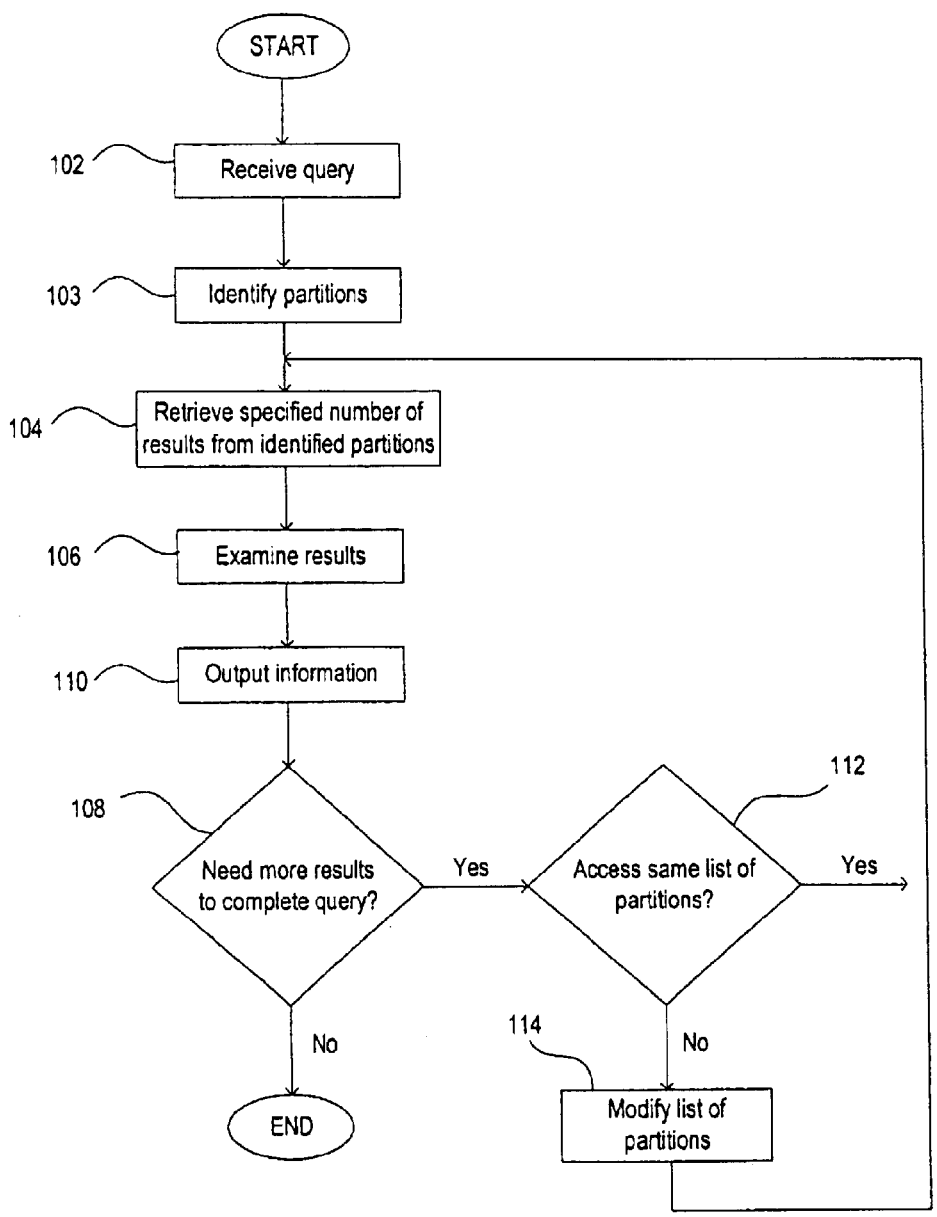
FIG. 1 shows a process for executing a query according to an embodiment of the invention.

FIG. 1 shows a flowchart of a process for executing a query according to an embodiment of the invention. At 102, the process receives a suitable query that searches for data within a partitioned database table. As noted above, partitioning in a database system generally refers to the process of decomposing an object into a greater number of relatively smaller objects.

The partitions that should be accessed to satisfy the query are identified (103). In one embodiment, each relevant partition possibly containing information responsive to the query is identified as a partition that must be searched; all other partitions not containing relevant information can be "pruned" from the search. Alternatively, the process can search all the partitions to execute the query, regardless of the relevance of any particular partition to the query terms.

The process initially retrieves only a specified number of responsive rows from each partition, where each partition is accessed in a round-robin manner (i.e., retrieve n rows from a first partition, then another n rows from a second partition, etc.) (104). In effect, the query is initially executed against only a portion of each partition, and the initial set of results for each partition may contain only a small subset of the responsive rows for that partition. Other access procedures may also be used. For example, the partitions could be accessed in a sort/merge process in a non-round-robin approach wherein a number of rows are retrieved and merged from certain partitions but are not yet consumed from other partitions. In addition, partitions can be accessed in parallel, thereby increasing scalability. The initial sets of results are returned from the partitions, where they are examined as a group (106). The entire group of results is examined to determine which rows should be immediately output to the user as the initial set of query responses.

From the initial group of results, some of the rows are immediately provided to the user (110). It is noted that the first set of query responses can therefore be provided to the user after only a portion of each partition as been accessed, which significantly improves the response time for displaying information to users when compared to systems that require all partitions to be fully queried before any results are returned.

The process then determines whether more rows must be retrieved to fully satisfy the query (108). If so, then the above steps are repeated, with another specified number of responsive rows retrieved from each partition (104), with the results from all partitions examined as a group (106), and the next set of results immediately provided to the user (110). In an embodiment, the previously retrieved rows are merged into the new group of retrieved rows to identify the specific query result rows that should be presented to the user. These process actions repeat until no more rows are to be retrieved from the partitions to satisfy the query.

In one embodiment, the list of identified partitions to query may be modified, even during the middle of the process, when it is recognized that one or more partitions can be pruned from the search (112 and 114). This may occur, for example, when the initial sets of rows retrieved from a partition make it clear that the partition will not contain any rows needed to fully satisfy the query.

Illustrative Embodiment

To illustrate the invention in more detail, reference is made to an example database table shown as Salary Table 200 in FIG. 2a. Salary Table 200 is a database table having a first column 202 to store userid values and a second column 204 to store salary information for each corresponding userid. Each row in salary table 200 corresponds to a distinct userid value. For many reasons, it may be desirable to decompose salary table 200 into multiple partitions. For example, if salary table 200 contains a very large number of rows, then database maintenance operations may be more efficiently performed if the salary table 200 is stored into multiple, smaller partitions. In addition, if a query seeks information that only exists in a subset of the partitions, then query efficiency improves if all partitions not containing relevant information is pruned from query execution.

Figure 2B:
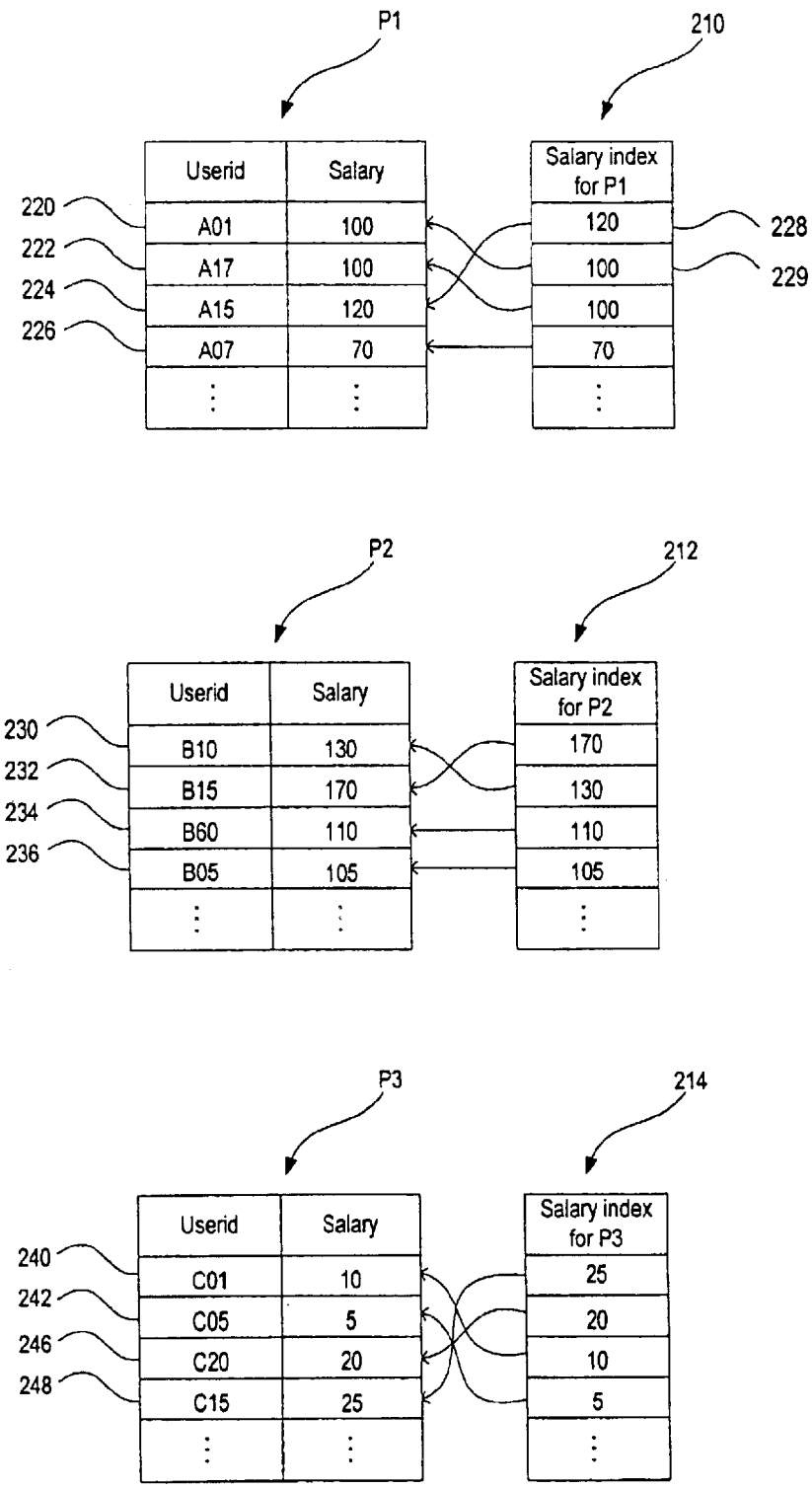

FIG. 2b shows an example partitioning scheme that may be imposed upon the salary table 200 of FIG. 2a. In this partitioning scheme, a "partitioning criteria" is established that separates the data in the salary table 200 based upon the first letter of the userid value for each row. All rows in salary table 200 having a userid value beginning with the letter "a" is stored in a first partition p1. Similarly, all rows in salary table 200 having a userid value beginning with the letter "b" is stored in a second partition p2, and all rows having a userid value beginning with the letter "c" is stored in a third partition p3.

One or more local indexes may be associated with each partition. In one embodiment, a local index is a partitioned index that is associated with data in a specific partitioned table. The partitioning criteria for the local index is usually the same as that for the partitioned table. For example, an index 210 may exist to index the values in the salary column for partition p1. Many types of indexes provide a sorted order to the information referenced by the index. Thus, index 210 could be structured such that the index entries are sorted based the value in the salary columns of corresponding rows in partition p1. Any suitable index structure may be used to provide a local index 210, e.g., a B*-tree index structure. Local index 210 is shown in FIG. 2b with index entries corresponding to a sorted order for the rows in partition p1, ordered by the values in the salary column of each row. Similar local indexes 212 and 214 are shown for partitions p2 and p3, respectively.

Consider if the following query (in the structure query language or "SQL") is placed against Salary table 200:

SELECT*
FROM Salary_Table
ORDER BY salary
WHERE rownum<5

This query requests the top four rows from the salary table 200 where the rows are sorted based upon values in the salary column of the table.

In a traditional approach to performing this query, all of the rows from all of the partitions p1, p2, and p3 would be retrieved and sorted into a temporary result set. The first four rows from the temporary result set would be returned as the final output result to the query. This approach has the serious performance and scalability issues in that it requires processing of results for all rows of all partitions, even though only the top four rows are actually needed to satisfy the query. If the salary table 200 contains a large number of rows, then the overhead of retrieving and storing the retrieved data could be considerable. In addition, a significant amount of overhead would be consumed to sort the large quantity of rows in the temporary result set. Moreover, the query response time suffers if the entire quantity of data must be processed before any results are returned to the user.

Figure 3:
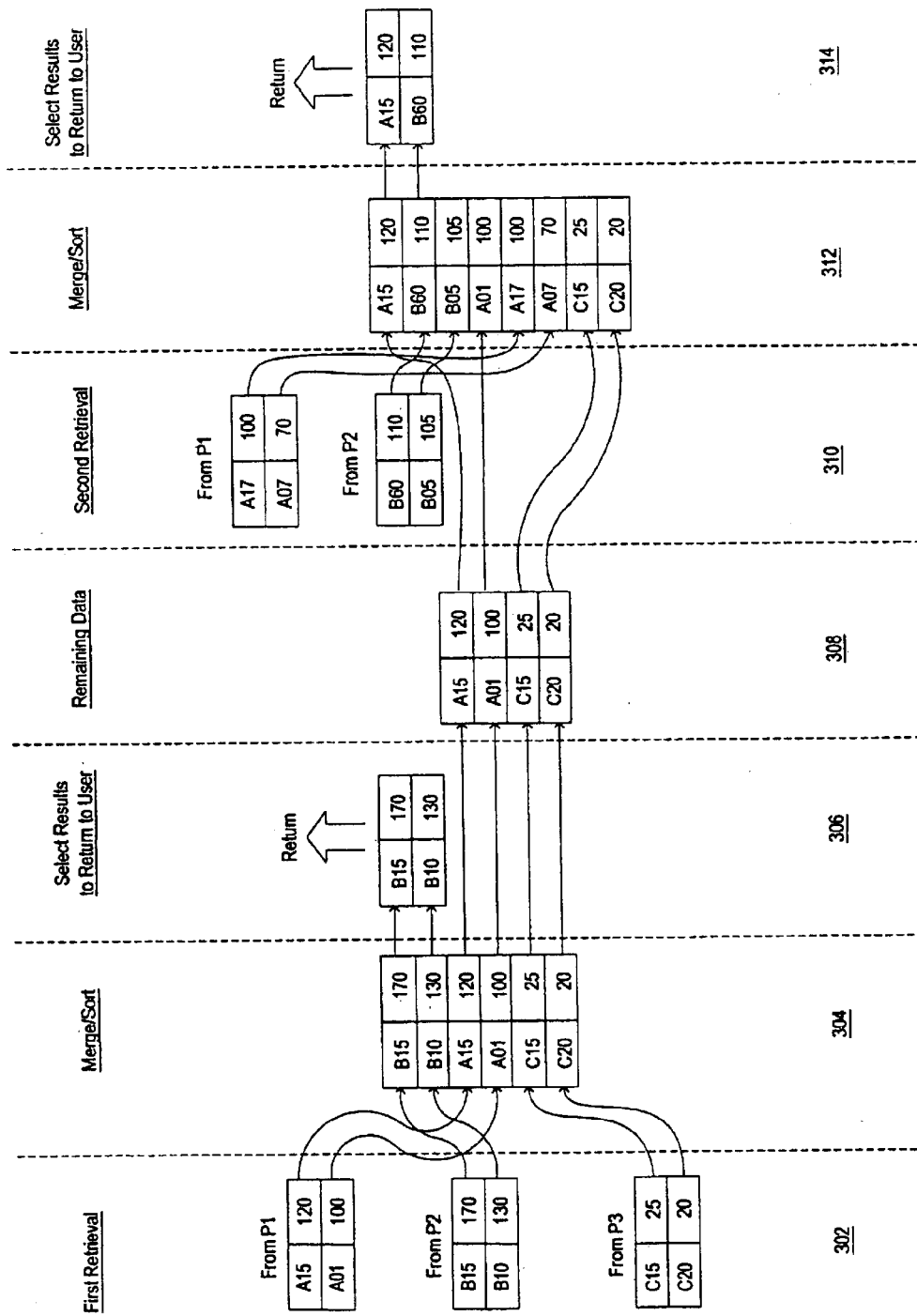
FIG. 3 shows an illustrative use of the invention to execute a query according to one embodiment.

FIG. 3 graphically illustrates how this query is processed to improve response time according to one embodiment of the invention. From left to right, the columns in FIG. 3 illustrate the progression of steps that occur to process the above query.

In column 302, a specified number of rows are retrieved from each partition. The number of rows to retrieve from each partition is dependent upon the specific use to which the invention is directed. A balance can be drawn between the granularity at which results are produced, the required response time for initial results, the number of passes that may be needed to completely satisfy the query, and the overhead involved in identifying/retrieving a given row or set of rows from a partition. If a larger number of rows are retrieved each time, then fewer passes are needed to retrieve the necessary rows from the partitions to satisfy the query, but a greater period of delay may exist before providing results because of the larger number of rows that must be retrieved, stored, and sorted for each pass. However, a smaller number of rows retrieved each time may result in higher overall costs to satisfy the query because more passes may be needed to fully retrieve the needed rows, which result in additional overhead in performing more operations to retrieve, store, and sort rows form the partitions. If the partitions have a very high fixed order, then a large number of rows can be advantageously retrieved each time, according to an embodiment. Even if only a single row is retrieved for each polling round, this can provide useful information that can be used to determine whether any partitions should be pruned from the process. The subsequent passes can thereafter retrieve a larger numbers of rows from targeted partitions. Alternatively, a large number of rows can be retrieved in the initial polling round, with smaller numbers of rows for subsequent rounds. In one embodiment, a different number of rows may be retrieved from different partitions. In the simplest case, the number of rows to retrieve from each partition can equal the number of rows that must be returned to satisfy a query (i.e., retrieve n rows from each partition if the query contains the clause "WHERE rownum<n"), which allows the process to complete after only a single round of polling.

For the example shown in FIG. 3, two rows are retrieved from each partition. Since the query seeks the four rows in salary table 200 with the highest salary values, each retrieval from the partitions will be to retrieve the respective rows from each partition having the highest salary values for that partition. As noted in FIG. 2b, each partition p1, p2, and p3 corresponds to a local index 210, 212, and 214, respectively. Each local index corresponds to a sorted ordering, based upon salary values, for their respective partitions. Thus, the local indexes can be used to easily identify the rows in their corresponding partitions having the highest salary values.

As seen from local index 210 in FIG. 2b, the two index entries 228 and 229 for the two highest salary values correspond to rows 224 and 220 in partition p1. For partition p2, the local index 212 can be used to identify rows 232 and 230 as having the highest salary values in the partition. Similarly, local index 214 can be used to identify rows 248 and 246 as having the highest salary values in partition p3. Therefore, each identified set of rows are retrieved from partitions p1, p2, and p3 during the actions performed in column 302 of FIG. 3.

While the present example shows local indexes being used to identify specific rows to retrieve from each partition, it is noted that other structures may be used to identify the rows to retrieve. If a sorted ordering for each partition is needed to help identify rows to retrieve, then any other structure that provides ordering information for the partition may be used. In some circumstances, a structure can be dynamically constructed to provide this ordering information. As just one example, consider if local indexes exist for partitions p1 and p2, but not for partition p3. During query execution or optimization, a local index can be dynamically constructed for partition p3 to provide ordering information for that partition. The cost/benefit of dynamically constructing this new local index will vary depending upon existing system conditions, such as the number of rows in each partition and the number of rows sought by the query. Alternatively, a table scan is performed for p3.

Referring back to FIG. 3, column 304 shows the rows retrieved from each partition being merged together and sorted as a group. It logically follows that if the two highest salary value rows from each partition for salary table 200 is retrieved, and the entire group of retrieved rows is sorted, then the two rows having the highest salary values for the group will also correspond to the two highest salary values for the entire salary table 200. Thus, the two rows having the highest salary values can be immediately returned to the user, as shown in column 306 of FIG. 3. Since the query calls for the four rows from salary table 200 having the highest salary values, half of the required query response is immediately being provided to the user.

This highlights a significant advantage of the present invention. It is noted that in a traditional approach, all of the rows from all of the partitions are retrieved and sorted before any results are returned to the query. If the salary table 200 contains thousands or millions of rows, then the response time of the traditional approach will greatly suffer since thousands or millions of rows must first be processed before any results are provided to the user. Using this embodiment of the present invention for this example, only six rows are retrieved and sorted from salary table 200 (rows 220, 224, 230, 232, 246, and 248) before the first set of results are returned to the query, regardless of the absolute number of rows that exist for salary table 200.

Once the first set of results is returned to the query, a determination is made whether further rows must be retrieved to satisfy the query. Here, the query calls for four rows to be returned, and only two rows were provided in the actions of column 306. Thus, additional rows are to be retrieved from the partitions of salary table 200 to satisfy the query. Column 308 shows the already retrieved rows that remain after the first set of results are returned to the user.

A determination can be made whether any partitions can be pruned from additional processing. If a given partition does not contain any rows that can possibly be retrieved and returned to satisfy the stated query conditions, then the partition can be pruned from further processing. Here, it is noted that the retrieved rows for partition p3 correspond to salary values of "25" and "20". Based upon the local index for partition p3, it is known that all other rows in partition p3 contain salary values that are equal to or less than these values. Since only two more rows with high salary values are needed to fully satisfy the query, and the two rows corresponding to userids A15 and A01 (rows 224 and 220) have already been identified (but not yet returned) with salary values higher than any rows that may be retrieved from partition p3, no additional rows retrieved from partition p3 can possibly affect the query results. Thus, partition p3 can be pruned from additional processing.

Note that partition p2 cannot be pruned from additional processing, since it is possible that this partition contains rows having salary values higher than the two rows corresponding to userids A15 and A01 (rows 224 and 220). Depending upon specific system configuration settings, it is possible that partition p1 can be pruned from further processing, since local index 210 makes it clear that no additional rows in partition p1 can have higher salary values than rows 224 and 220 (these are the two highest salary value rows in partition p1). However, it is possible that another row in partition p1 has the same salary value as row 220 (such as row 222). Thus, depending upon the specific configuration requirements to which the invention is directed, the system can be configured to either continue processing partition p1, or prune this partition p1 from further processing. For the purpose of illustrating the example in FIG. 3, partition p1 will not be pruned from further processing.

Two additional rows are therefore retrieved from partitions p1 and p2, as shown in column 310 of FIG. 3. The retrieved rows correspond to the highest salary values for the remaining rows in each respective partition. According to one embodiment, the number of rows to retrieve in each pass remains the same as the number of rows retrieved during initial pass. Alternatively, the number of rows to retrieve may be adjusted based upon information or statistics gather during a previous pass. Some of the considerations that may be considered before adjusting the number of rows are similar to the considerations previously described with respect to selecting an initial number of rows to retrieve.

The newly retrieved rows are merged with the previously retrieved rows that have not yet been returned as query results, and the entire set of rows is sorted as a group, as shown in column 312 of FIG. 3. The two rows having the highest salary values correspond to the highest salary values for all remaining rows in salary table 200. Thus, the two rows having the highest salary values (having userids of A15 and B60) are provided as the next set of results to the query, as shown in column 314. Since a total of four rows has been provided, the query is now fully satisfied.

In this example, the query includes a WHERE clause. It is noted that the present invention is usable to improve response time and provides performance benefits even if the type of WHERE clause shown in the example query is not present.

The present invention can also be applied to database systems that employ user-defined indexes and ancillary operators. A method and system for implementing user-defined indexes involving index types and index access routines not native to a database system in described in more detail in U.S. Pat. No. 5,893,104, entitled "Extensible Indexing," issued on Apr. 6, 1999, which is hereby incorporated by reference in its entirety. Ancillary operators involve a class of database operators for which data ("ancillary data") may be shared between operations. In one approach, a context object is defined to store data from a first operator, which is thereafter usable by a related ancillary operator to share data within the context object. A suitable mechanism for implementing ancillary operators in disclosed in U.S. application Ser. No. 09/436,046, entitled "A Mechanism for Sharing Ancillary Data Between a Family of Related Functions," filed on Nov. 8, 1999, which is hereby incorporated by reference in its entirety.

Consider the following query executing against a Students table:

SELECT *
FROM Students_Table
WHERE contains (resume, 'Biology', 1) and rownum<= 100
ORDER BY rank(1);

For the purpose of this example, the contains( ) function is an operator that accepts two parameters O1 and O2 (O1 corresponds to "resume" and O2 corresponds to "Biology" in this example query). The contains( ) function returns a True/False flag that indicates whether the entity represented by the O1 parameter contains the text of the value in the O2 parameter. The rank( ) function is an ancillary operator that ranks the various rows in the relative order of significance to the contains(operator. Since rank( ) and contains( ) can be configured as related operators, common ancillary data can be accessed between these operators. Thus, this query seeks the top 100 ranked rows in the Student table that is responsive to the contains( ) operator/predicate in the WHERE clause. Assume that the Student table is decomposed into ten partitions, and a suitable local user-defined index exists for each partition.

One approach to evaluating this type of query in a database system is to evaluate the contains( ) operator for each partition, store the results until all partitions have been evaluated, rank the collected results for all the partitions, and then return the top 100 rows from the ranked results. The drawbacks with such an approach have been described in detail above, including excessive overhead consumption for retrieving, storing, and sorting rows from all partitions, and blocking all results until all partitions have been processed, even though only 100 rows need to be returned.

In an embodiment of the present invention, the server pushes down the evaluation of the rank( ) operator to each individual partition in addition to the contains( ) operator, and the results are polled from each partition. This may be accomplished by maintaining an index on the partition that is capable of returning rows in the rank( ) order. Each partition returns a specified number of rows that have been ranked within that partition. The server polls all the partitions and collects the respective results from the partitions. After the first round of the polling, the server can return a subset of the result rows to the user and decide if additional polling should be performed. If it does, polling is performed to return another result set of rows from the partitions. As described above, a subset of partitions can be eliminated from the polling after every round of polling is complete.

If the cost of evaluating rank( ) is relatively high, then fewer rows are retrieved during each polling round, according to one embodiment. However, if the computational expense of evaluating rank( ) is relatively low, then more rows are retrieved during each pass. For example, evaluating this type of ancillary operator on some systems may require an external callout, which is normally much more expensive than a native function call.

In one embodiment, the inventive process further comprises a step to identify specific queries that may benefit from the invention, and only applying the invention to these identified queries. In an embodiment, the following are examples of characteristics that maybe used, whether in combination or separately, to identify such queries: (a) queries that should be optimized for response time rather than total throughput; (b) queries having a sorting or ordering element (e.g., having an "ORDER BY" clause); (c) queries against a partitioned objects; (d) an index or other structure is already available to provide ordering information for partitions being queried; and, (e) queries that seek to limit the number of responses (e.g., using a "WHERE rownum<n" clause).

System Architecture Overview

Figure 4:
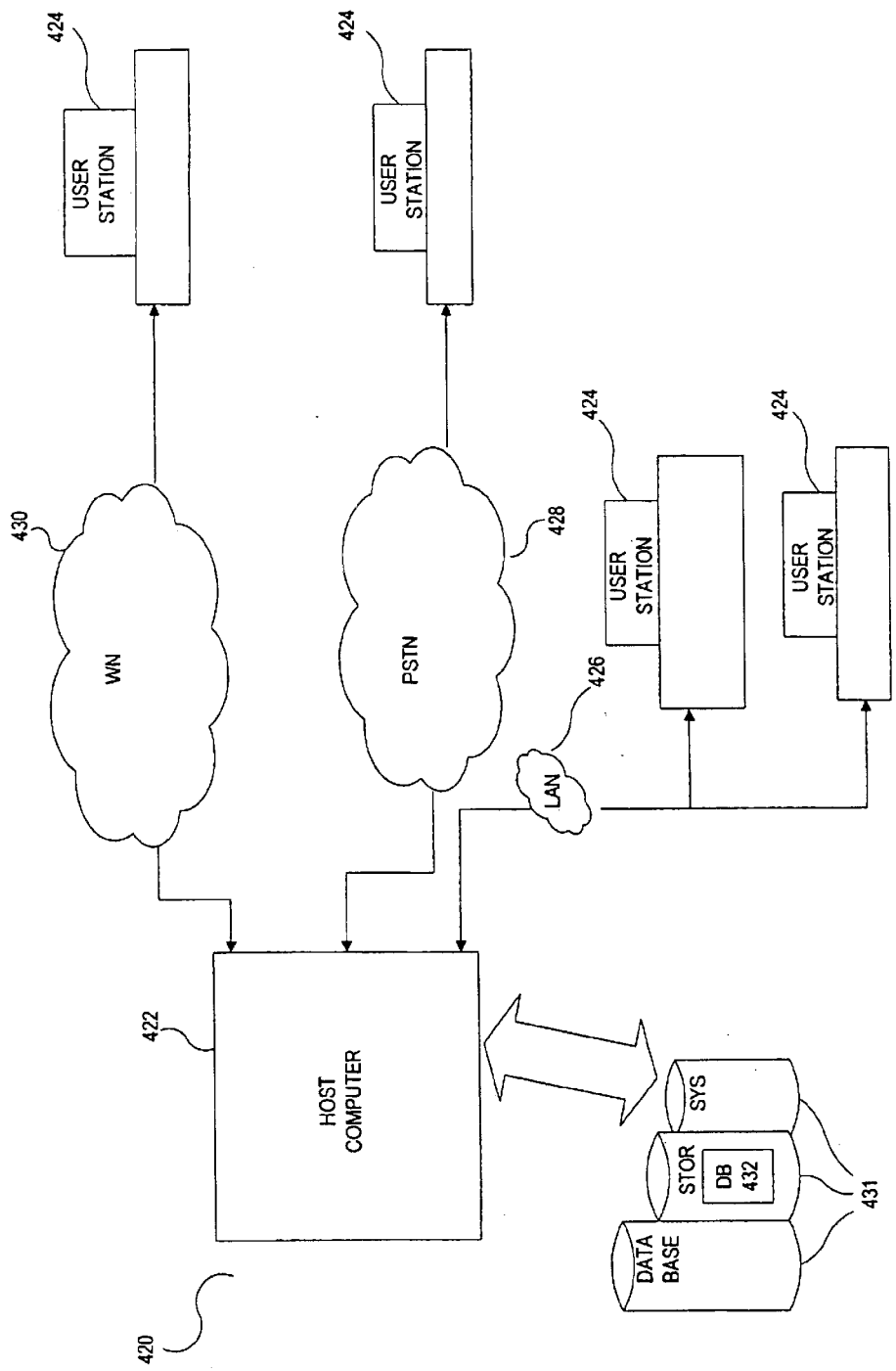
FIGS. 4 and 5 are diagrams of system architectures with which the present invention may be implemented.

Referring to FIG. 4, in an embodiment, a computer system 420 includes a host computer 422 connected to a plurality of individual user stations 424. In an embodiment, the user stations 424 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 424 are connected to the host computer 422 via a local area network ("LAN") 426. Other user stations 424 are remotely connected to the host computer 422 via a public telephone switched network ("PSTN") 428 and/or a wireless network 430.

In an embodiment, the host computer 422 operates in conjunction with a data storage system 431, wherein the data storage system 431 contains a database 432 that is readily accessible by the host computer 422. Note that a multiple tier architecture can be employed to connect user stations 424 to a database 432, utilizing for example, a middle application tier (not shown). In alternative embodiments, the database 432 may be resident on the host computer, stored, e.g., in the host computer's ROM, PROM, EPROM, or any other memory chip, and/or its hard disk. In yet alternative embodiments, the database 432 may be read by the host computer 422 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 422 can access two or more databases 432, stored in a variety of mediums, as previously discussed.

Figure 5:
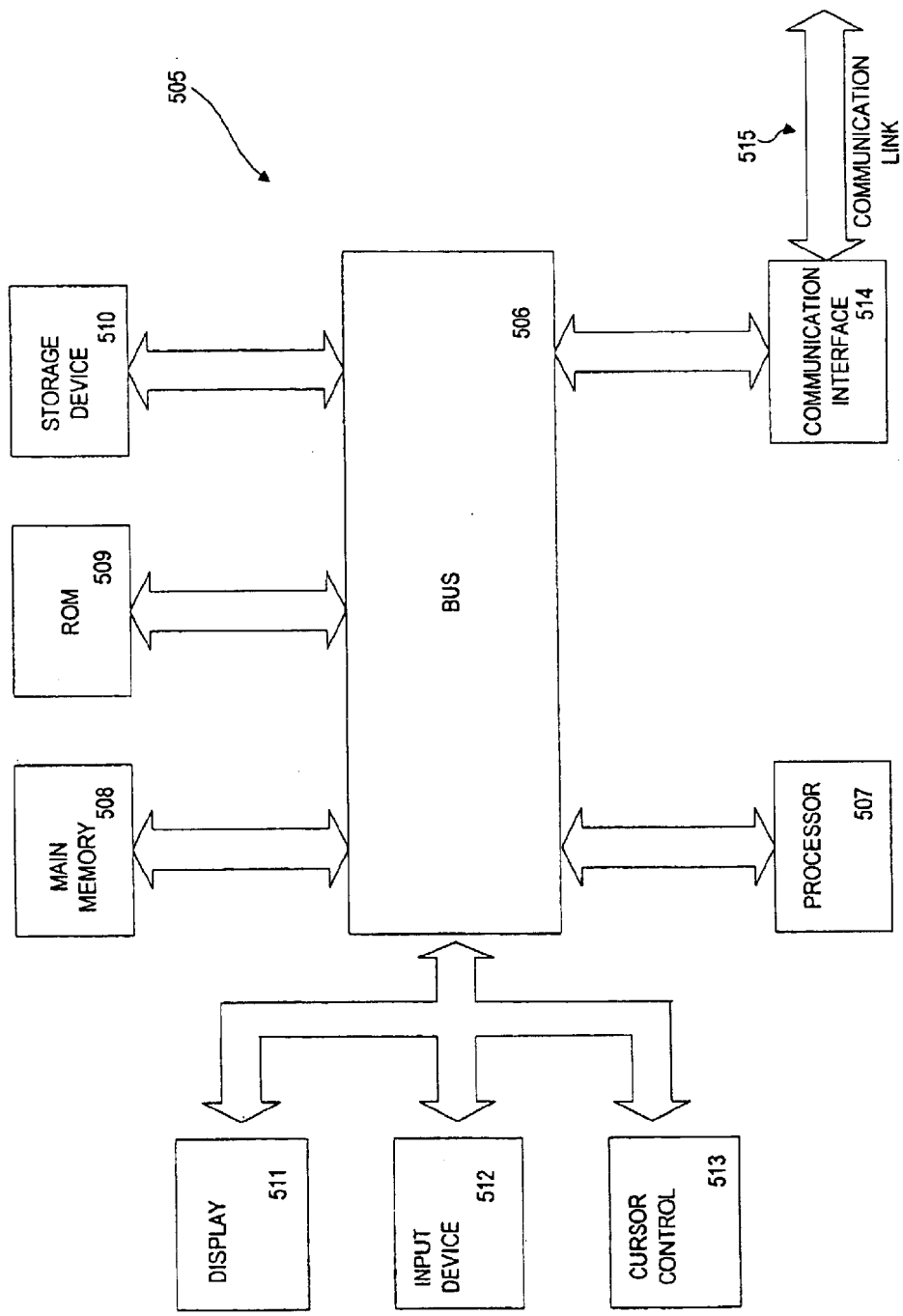

Referring to FIG. 5, in an embodiment, each user station 424 and the host computer 422, each referred to generally as a processing unit, embodies a general architecture 505. A processing unit includes a bus 506 or other communication mechanism for communicating instructions, messages and data, collectively, information, and one or more processors 507 coupled with the bus 506 for processing information. A processing unit also includes a main memory 508, such as a random access memory (RAM) or other dynamic storage device, coupled to the bus 506 for storing dynamic data and instructions to be executed by the processor(s) 507. The main memory 508 also may be used for storing temporary data, i.e., variables, or other intermediate information during execution of instructions by the processor(s) 507. A processing unit may further include a read only memory (ROM) 509 or other static storage device coupled to the bus 506 for storing static data and instructions for the processor(s) 507. A storage device 510, such as a magnetic disk or optical disk, may also be provided and coupled to the bus 506 for storing data and instructions for the processor(s) 507.

A processing unit may be coupled via the bus 506 to a display device 511, such as, but not limited to, a cathode ray tube (CRT), for displaying information to a user. An input device 512, including alphanumeric and other columns, is coupled to the bus 506 for communicating information and command selections to the processor(s) 507. Another type of user input device may include a cursor control 513, such as, but not limited to, a mouse, a trackball, a fingerpad, or cursor direction columns, for communicating direction information and command selections to the processor(s) 507 and for controlling cursor movement on the display 511.

According to one embodiment of the invention, the individual processing units perform specific operations by their respective processor(s) 507 executing one or more sequences of one or more instructions contained in the main memory 508. Such instructions may be read into the main memory 508 from another computer-usable medium, such as the ROM 509 or the storage device 510. Execution of the sequences of instructions contained in the main memory 508 causes the processor(s) 507 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 507. Such a medium may take many forms, including, but not limited to, non-volatile, volatile and transmission media. Nonvolatile media, i.e., media that can retain information in the absence of power, includes the ROM 509. Volatile media, i.e., media that can not retain information in the absence of power, includes the main memory 508. Transmission media includes coaxial cables, copper wire and fiber optics, including the wires that comprise the bus 506. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 507 can retrieve information. Various forms of computer-usable media may be involved in providing one or more sequences of one or more instructions to the processor(s) 507 for execution. The instructions received by the main memory 508 may optionally be stored on the storage device 510, either before or after their execution by the processor(s) 507.

Each processing unit may also include a communication interface 514 coupled to the bus 506. The communication interface 514 provides two-way communication between the respective user stations 524 and the host computer 522. The communication interface 514 of a respective processing unit transmits and receives electrical, electromagnetic or optical signals that include data streams representing various types of information, including instructions, messages and data. A communication link 515 links a respective user station 524 and a host computer 522. The communication link 515 may be a LAN 426, in which case the communication interface 514 may be a LAN card. Alternatively, the communication link 515 may be a PSTN 428, in which case the communication interface 514 may be an integrated services digital network (ISDN) card or a modem. Also, as a further alternative, the communication link 515 may be a wireless network 430. A processing unit may transmit and receive messages, data, and instructions, including program, i.e., application, code, through its respective communication link 515 and communication interface 514. Received program code may be executed by the respective processor(s) 507 as it is received, and/or stored in the storage device 510, or other associated non-volatile media, for later execution. In this manner, a processing unit may receive messages, data and/or program code in the form of a carrier wave.

What is claimed is:

1. A method for improving response time of a query against a partitioned database table, the method comprising:

(a) receiving a query directed to a database table, the database table comprising a plurality of partitions;

(b) identifying a set partitions from the plurality of partitions to access to satisfy the query;

(c) defining a specified number of rows to retrieve from each partition of the set of partitions, the specified number of rows less than the total number of rows responsive to the query from the set of partitions;

(d) retrieving the specified number of rows from each partition of the set of partitions to form a result set;

(e) examining the result set to identify one or more response rows to provide for the query; and (f) providing the one or more response rows.

2. The method of claim 1 in which the query contains one or more ancillary operators.

3. The method of claim 1 in which a local index exists for each partition of the set of partitions, the local index used to retrieve the specified number of rows.

4. The method of claim 3 in which the local index is a user-defined index.

5. The method of claim 3 in which the local index is a B*-tree index.

6. The method of claim 3 in which the local index provides a sorted ordering for rows in a corresponding partition.

7. The method of claim 3 in which the local index is dynamically generated.

8. The method of claim 1 in which the act of examining the result set comprises:

sorting the result set; and selecting the one or more lows from the sorted result set.

9. The method of claim 1 wherein steps d–f are repeated until all rows requested by the query has been provided.

10. The method of claim 9 in which a subsequent iteration of steps d–f uses a second specified number of rows to retrieve from each partition in the set of partitions.

11. The method of claim 9 further comprising:

pruning one or more partitions during a subsequent iteration of steps d–f.

12. The method of claim 9 in which an earlier iteration of steps d–f has a higher specified number of rows than a later iteration of steps d–f.

13. The method of claim 1 in which the specific number of rows equals a number of rows that must be returned to satisfy the query.

14. The method of claim 1 in which the query involves sorting across multiple partitions.

15. The method of claim 1 in which the query is identified for improved optimized response time rather than throughput.

16. The method of claim 1 in which the query limits response rows that should be returned for the query.

17. The method of claim 1 in which the act of examining the result set comprises:

merging later retrieved rows into the result set, wherein the result set comprises earlier retrieved rows.

18. The method of claim 1 in which the result set is sorted.

19. A computer-usable medium comprising a data set product produced by the method of claim 1.

20. A computer product that includes a medium usable by a processor, the medium comprising a sequence of instructions which, when executed by said processor, causes said processor to execute a process for executing a query against a partitioned database table, the process comprising:

(a) receiving a query directed to a database table, the database table comprising a plurality of partitions;

(b) identifying a set of partitions from the plurality of partitions to access to satisfy the query;

(c) defining a specified number of rows to retrieve from each partition of the set of partitions, the specified number of rows less than the total number of rows responsive to the query from the set of partitions;

(d) retrieving the specified number of rows from each partition of the set of partitions to form a result set;

(e) examining the result set to identify one or more response rows to provide for the query; and (f) providing the one or more response rows.

21. A system for executing a query against a database object comprising:

(a) means for receiving a query directed to a database table, the database table comprising a plurality of partitions;

(b) means for identifying a set of partitions from the plurality of partitions to access to satisfy the query;

(c) means for defining specified number of rows to retrieve from each partition of the set of partitions, the specified number of rows less than the total number of rows responsive to the query from the set of partitions;

(d) means for retrieving the specified number of rows from each partition of the set of partitions to form a result set;

(e) means for examining the result set to identify one or more response rows to provide for the query; and (f) means for providing the one or more response rows.

22. The computer am product of claim 20 which the act of examining the result set comprises:

sorting the result set; and selecting the one or more rows from the sorted result set.

23. The computer program product of claim 20 wherein steps d–f are repeated until all rows requested by the query has been provided.

24. The computer program product of claim 23 in which a subsequent iteration of steps d–f uses a second specified number of rows to retrieve from each partition in the set of partitions.

25. The system of claim 21 in which the query contains one or more ancillary operators.

26. The system of claim 21 in which a local index exists for each partition of the set of partitions, the local index used to retrieve the specified number of rows.

27. The system of claim 26 in which the local index is a user-defined index.

28. The system of claim 26 in which the local index is a B*-tree index.

29. The system of claim 26 in which the local index provides a sorted ordering for rows in a corresponding partition.

30. The system of claim 26 in which the local index is dynamically generated.

31. The system of claim 21 in which said means for examining the result set comprises:

means for sorting the result set; and means for selecting the one or more rows from the sorted result set.

32. The system of claim 21 wherein all rows requested by the query are provided.

33. The system of claim 32 in which a subsequent iteration uses a second specified number of rows to retrieve from each partition in the set of partitions.

* * * * *

UNITED STATES PATENT AND TRADEMARK OFFICE
CERTIFICATE OF CORRECTION

PATENT NO. : 6,795,817 B2
DATED : September 21, 2004
INVENTOR(S) : Nipun Agarwal and Ravi Murthy Page 1 of 1

It is certified that error appears in the above-identified patent and that said Letters Patent is hereby corrected as shown below:

Title page,
Item [56], References Cited, U.S. PATENT DOCUMENTS,
"5,960,194" refernce, delete "77/102" and insert -- 707/102 --.

Column 11,
Line 32, delete "lows" and insert -- rows --.
Line 61, after "computer" insert -- program --.

Column 12,
Line 31, delete "am" and insert -- program --.
Line 31, after "claim 20" insert -- in --.

Signed and Sealed this

Seventh Day of February, 2006

JON W. DUDAS
*Director of the United States Patent and Trademark Office*